(12) United States Patent
O'Brien

(10) Patent No.: US 12,116,740 B1
(45) Date of Patent: *Oct. 15, 2024

(54) WATER SUPPLY CONTROL SYSTEM THAT IMPLEMENTS SAFETY CONTROLS AND USES SIMULATION TO PREVENT COMMANDS THAT WOULD CAUSE OR WORSEN FLOODING

(71) Applicant: O'Brien Engineering, Inc., Carrollton, TX (US)

(72) Inventor: Norman James O'Brien, Carrollton, TX (US)

(73) Assignee: O'BRIEN ENGINEERING, INC., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,045

(22) Filed: Apr. 24, 2023

Related U.S. Application Data

(63) Continuation of application No. 17/214,649, filed on Mar. 26, 2021, now Pat. No. 11,674,279.

(Continued)

(51) Int. Cl.
*G05B 17/02* (2006.01)
*E02B 1/00* (2006.01)
(Continued)

(52) U.S. Cl.
CPC ............... *E02B 1/00* (2013.01); *E02B 3/02* (2013.01); *E02B 3/041* (2015.09); *E02B 3/104* (2013.01); *G05B 17/02* (2013.01); *G05D 9/12* (2013.01)

(58) Field of Classification Search
CPC ... E02B 1/00; E02B 3/02; E02B 3/041; E02B 3/104; G05B 17/02; G05D 9/12
See application file for complete search history.

(56) References Cited

U.S. PATENT DOCUMENTS

| | | | | |
|---|---|---|---|---|
| 5,835,386 | A | * 11/1998 | Orr | .......................... G06T 17/05 703/2 |
| 2014/0056645 | A1 | * 2/2014 | Hogan | .................... G01W 1/10 405/80 |

(Continued)

FOREIGN PATENT DOCUMENTS

| KR | 101138098 B1 | * 4/2012 | ........... G06Q 50/265 |
|---|---|---|---|
| KR | 101138098 | 4/2021 | |

OTHER PUBLICATIONS

Ficci, A. Optimal operation of the multi-reservoir system in the Seine River basin using deterministic and ensemble forecasts, 2016, URL:<https://research-information.bris.ac.uk/en/publications/optimal-operation-of-the-multireservoir-system-in-the-seine-river> (Year: 2016).*

(Continued)

*Primary Examiner* — Kenneth M Lo
*Assistant Examiner* — Jonathan Michael Skrzycki
(74) *Attorney, Agent, or Firm* — Conley Rose, P.C.; Elexis A. Jones; Brooks W Taylor

(57) ABSTRACT

A water supply control system is disclosed that comprises a computer-implemented control system coupled to a plurality of gates, one or more pumps, and a plurality of sensors. The computer-implemented control system is configured to receive a request to transfer excess water from a non-water supply lake to a water supply lake and determine, based at least in part on data from the plurality of sensors and geographic locations of the non-water supply lake and the water supply lake, whether transferring water as requested will cause or worsen a flood event. In response to a determination that transferring water as requested will not cause or worsen a flood event, the computer-implemented control system is further configured to issue a command to cause a gate associated with a dam at the non-water supply lake to (Continued)

open such that water is transferred from the non-water supply lake to the water supply lake.

20 Claims, 4 Drawing Sheets

Related U.S. Application Data

(60) Provisional application No. 63/104,315, filed on Oct. 22, 2020, provisional application No. 63/001,033, filed on Mar. 27, 2020.

(51) Int. Cl.
*E02B 3/02* (2006.01)
*E02B 3/04* (2006.01)
*E02B 3/10* (2006.01)
*G05D 9/12* (2006.01)

(56) References Cited

U.S. PATENT DOCUMENTS

| | | | |
|---|---|---|---|
| 2016/0198645 A1* | 7/2016 | Weatherill | A01G 25/16 700/284 |
| 2018/0356772 A1* | 12/2018 | Cembrano | G05B 13/041 |
| 2019/0354873 A1* | 11/2019 | Pescarmona | G06N 3/02 |
| 2021/0326715 A1* | 10/2021 | Pescarmona | G06N 5/02 |
| 2022/0228356 A1* | 7/2022 | Elag | G06N 5/00 |

OTHER PUBLICATIONS

Shin Cheol Kyun, KR-101138098-B1 English Translation, 2012 (Year: 2012).*
Ficchi, A. et al., "Optimal operation of the multi-reservoir system in the Seine River basin using deterministic and ensemble forecasts", Jan. 2016, JOurnal of Water Resources Planning and Management vol. 142 Issue 1.
Office Action dated Sep. 6, 2022, U.S. Appl. No. 17/214,649, filed Mar. 26, 2021.
Notice of Allowance dated Jan. 25, 2023, U.S. Appl. No. 17/214,649, filed Mar. 26, 2021.

* cited by examiner

WATER SUPPLY CONTROL SYSTEM THAT IMPLEMENTS SAFETY CONTROLS AND USES SIMULATION TO PREVENT COMMANDS THAT WOULD CAUSE OR WORSEN FLOODING

CROSS-REFERENCE TO RELATED APPLICATIONS

This application claims the benefit of: 1) U.S. Non-Provisional application Ser. No. 17/214,649 filed on Mar. 26, 2021, and entitled "Water Supply Control System that Implements Safety Controls and Uses Simulation to Prevent Commands that Would Cause or Worsen Flooding," 2) U.S. Provisional Application No. 63/104,315 filed on Oct. 20, 2020 and entitled "Water Supply Control System," 3) U.S. Provisional Application No. 63/001,033 filed on Jun. 27, 2020 and entitled "Water Supply Control System," both of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a number of states, droughts are increasing in frequency, intensity, and duration, in part due to expanding population, the lag time involved in permitting new lakes, invasive species invasion, storage volume lost to siltation, etc. Many existing dams have degraded and are in need of rehabilitation.

SUMMARY

In an embodiment, a water supply control system for interconnecting a plurality of non-water supply lakes and one or more water supply lakes is disclosed. The system comprises a plurality of pipes adapted to transfer water between the plurality of non-water supply lakes and one or more water supply lakes and a plurality of gates associated with a plurality of dams at the plurality of non-water supply lakes and the one or more water supply lakes. The plurality of gates are adapted to adjust an amount of water flow through the plurality of pipes. The system also comprises one or more pumps adapted to pump water through a corresponding one or more of the plurality of pipes and a plurality of sensors associated with one or more of the non-water supply lakes and the water supply lakes. The system further comprises a computer-implemented control system coupled to the plurality of gates, the one or more pumps, and the plurality of sensors and configured to receive a request to transfer excess water from a non-water supply lake of the plurality of non-water supply lakes to a water supply lake of the one or more water supply lakes. The non-water supply lake and the water supply lake are associated with one or more geographic locations. The computer-implemented control system is also configured to determine, via a reservoir simulation modeling component based at least in part on data from the plurality of sensors associated with the non-water supply lake and the water supply lake and the geographic locations of the non-water supply lake and the water supply lake, whether transferring water from the non-water supply lake to the water supply lake will cause or worsen a flood event. The computer-implemented control system is further configured to, in response to a determination that transferring water from the non-water supply lake to the water supply lake will not cause or worsen a flood event, issue a command, via a monitoring, control, and command component, to cause a gate associated with a dam at the non-water supply lake to open such that water is transferred from the non-water supply lake to the water supply lake via one or more pipes of the plurality of pipes.

In another embodiment, a water supply control method for interconnecting a plurality of non-water supply lakes and one or more water supply lakes is disclosed. The method comprises receiving, by a computer-implemented control system coupled to a plurality of gates, one or more pumps, and a plurality of sensors, a request to transfer excess water from a currently non-water supply lake to an intermediate non-water supply lake or a water supply lake. The currently non-water supply lake and the intermediate non-water supply lake or the water supply lake are associated with one or more geographic locations. The method also comprises determining, via a reservoir simulation modeling component of the computer-implemented control system, based at least in part on data from the plurality of sensors associated with the currently non-water supply lake and the intermediate non-water supply lake or the water supply lake and the geographic locations of the currently non-water supply lake and the intermediate non-water supply lake or the water supply lake, whether transferring water from the currently non-water supply lake to the intermediate non-water supply lake or the water supply lake will cause or worsen a flood event. The method further comprises in response to a determination that transferring water from the currently non-water supply lake to the intermediate non-water supply lake or the water supply lake will not cause or worsen a flood event, issuing a command, via a monitoring, control, and command component of the computer-implemented control system, to cause a gate associated with a dam at the currently non-water supply lake to open such that water is transferred from the currently non-water supply lake to the intermediate non-water supply lake to the water supply lake via one or more pipes.

In yet another embodiment, a water supply control system for interconnecting a plurality of non-water supply lakes and one or more water supply lakes is disclosed. The system comprises a plurality of conveyance elements adapted to transfer water between the plurality of non-water supply lakes. The plurality of conveyance elements comprises a plurality of pipes. The system also comprises one or more water supply lakes and a plurality of gates associated with a plurality of dams at the plurality of non-water supply lakes and the one or more water supply lakes. The plurality of gates are adapted to adjust an amount of water flow through the plurality of pipes. The system additionally comprises one or more pumps adapted to pump water through a corresponding one or more of the plurality of pipes and a plurality of sensors associated with one or more of the non-water supply lakes and the water supply lakes. The system further comprises a computer-implemented control system coupled to the plurality of gates, the one or more pumps, and the plurality of sensors and configured to receive a request to transfer excess water from a non-water supply lake of the plurality of non-water supply lakes to a water supply lake of the one or more water supply lakes and in response to receiving the request, evaluate, via a monitoring, control, and command component, a plurality of safety controls. The computer-implemented control system is further configured to implement, via the monitoring, control, and command component, at least one safety control of the plurality of safety controls based on the evaluation and in response to implementation of the at least one safety control, issue a command, via the monitoring, control, and command component, to cause a gate associated with a dam at the non-water supply lake to open such that water is transferred from the non-water supply lake to the water supply lake via at least one of the plurality of conveyance elements.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
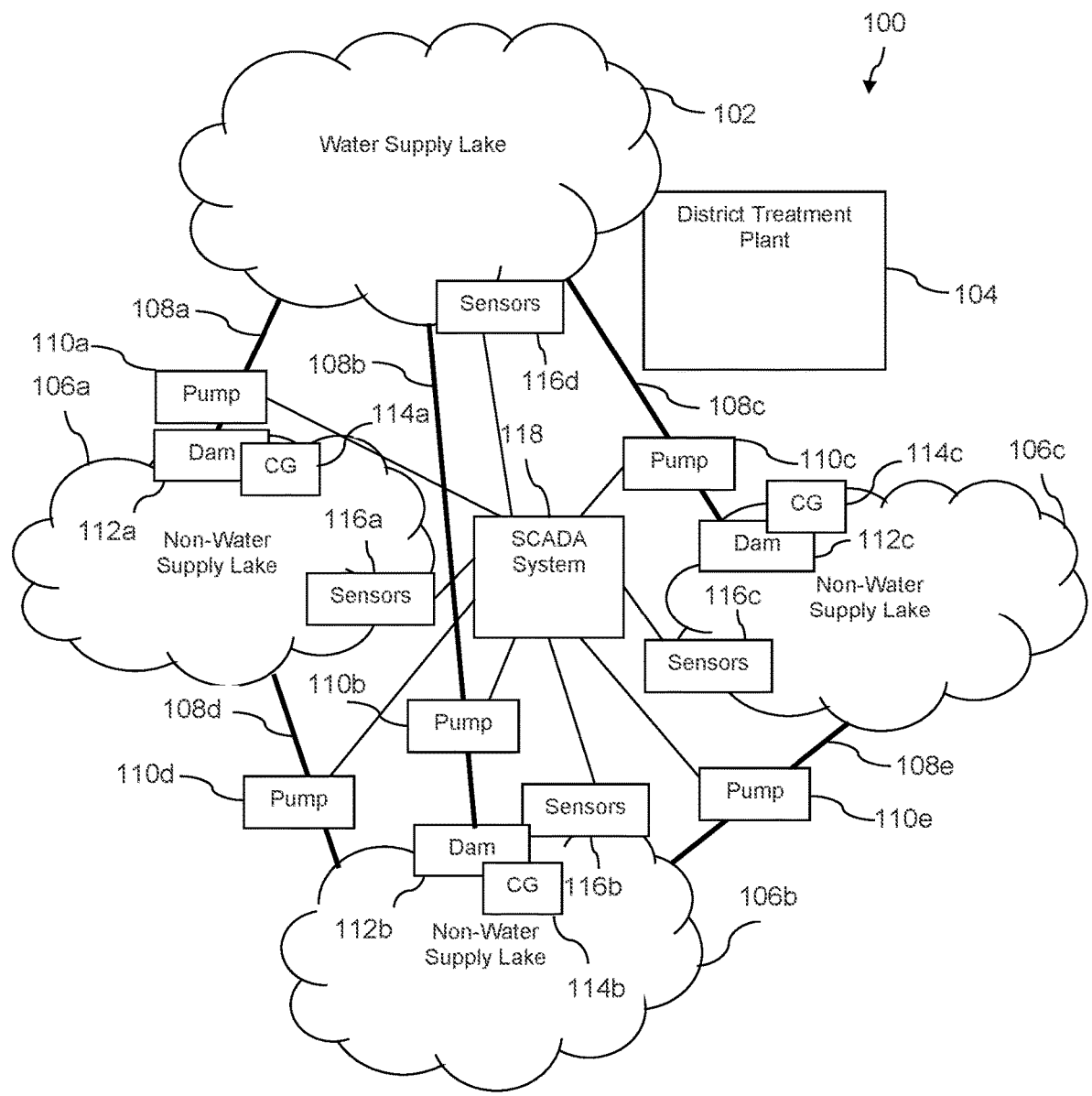
FIG. 1 is a block diagram of a water grid according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In a number of states such as Texas, droughts are increasing in frequency, intensity, and duration. This is in part due to expanding population. By some estimates, Texas is projected to reach a population of 52M by 2040, doubling the current population. Some estimates place current growth at the rate of 2500 people per day. According to TWDB website (www.waterfortexas.org) Texas lakes have a conservation capacity of 31.46M acre-feet. TWDB's *Water Use Snapshot for* 2000-2011 reported that for the single year worst drought of record, which was 2011, Texas used 18.09M acre-feet.

Increased frequency, intensity, and duration of droughts is also in part due to the lag time involved in permitting new lakes. For example, siting and permitting a new reservoir is a multiple decade undertaking involving feasibility studies aimed at determining the suitability of the site and potential impacts relative to one or more of the following: (1) area meteorology, (2) basin yield, hydrology, and hydraulics, (3) stratigraphy and surface soils, (4) topography, (5) flora and fauna, (6) historical land usage, (7) potential need for remediation, (8) property ownership, (9) social impacts, (10) water rights, and (11) economics.

Additionally, the zebra mussel invasion adds to the increased frequency, intensity, and duration of droughts. For example, the appearance of the zebra mussel has forced the temporary suspension of pumping from some Texas reservoirs and likely will continue unless and until a permanent solution can be determined.

Further, siltation has helped cause the increased drought frequency, intensity, and duration. Siltation of a lake reduces usable storage and places an increased pressure on the dam due to the fact that saturated soil is heavier against the dam than water alone.

There are many existing dams in these states experiencing increased droughts, and a large number of them need rehabilitation. The National Inventory of Dams indicates that there are 7310 dams in Texas. Many are in need of rehabilitation due to increased hazard classification, degraded structures, siltation, and/or degraded water quality. However, dam rehabilitation is often very expensive, the benefits of which are not easily realized by the owner. For example, rehabilitation costs are typically well into the six-figure range and often beyond, and consequently the local annualized benefits may only be fractional. Decommissioning, as an alternative to rehabilitation, is equally laden with complexities. In particular, decommissioning often is burdened with environmental regulatory requirements to stabilize or altogether remove contaminated sediments that have accumulated from runoff over decades of agricultural application of pesticides.

Many dams started out as rural "stock tanks" or erosion control structures and have since been surrounded by urbanization. Urbanization typically increases the quantity and peak flow rate of water that reaches the lake, increases the frequency of significant runoff events and decreases water quality. The increases in quantity, flow rate, and frequency, of course, result in degradation due to increased cycling and loading, but the decrease in water quality—water containing higher silt loads and various chemicals—leads to a decrease in both the quality and quantity of beneficial plants, that protect earthen dams and emergency spillways from scour. Water quality also can affect virtually every material used in the construction of any dam. As infrastructure encroaches into the inundation zone of a hypothetical catastrophic breach of the dam, the design flood of the dam increases, causing the dam to become deficient.

In time, all dams degrade. Concrete degrades due to chemical attack and weathering. Steel rusts. Subsidence occurs to some degree in all earthen dams. Burrowing animals, and ants create cavities that may become flow paths leading to dam failure. Livestock allowed on an earthen dam causes differential soil compaction, killing grass and other ground cover intended to protect the dam from surface erosion; the differential compaction can also lead to cracking. Livestock and burrowing animals alike wear paths across the top of the dam to the water's edge. Trees allowed to grow above 3 or 4 inches in diameter can penetrate deeply into the dam's clay core creating potential flow paths for failure particularly after the tree dies. Wind generated waves erode the upstream face of the dam causing the slope to be effectively steeper, denuded, and less stable.

Many of the dams built in Texas were originally constructed with considerable federal dollars, for instance, those built by the National Resource Conservation Service (formerly Soil Conservation Service), as an initiative of PL 74-461 (the Soil Conservation and Domestic Allotment Act of 1936) to reduce erosion and flooding of agricultural lands. These dams were left to be managed by local sponsors, many of whom not only lacked the capacity to build the dam of their own accord in the first place, but who now yet do not have the wherewithal to maintain, upgrade, or decommission the degraded dams. Many such dams, conceived and implemented as regional economic stabilizers, now having reached their useful life expectancy (typically 50 years), lack legislative programmatic support to sustain their original mission let alone any initiative to re-task for current needs.

Most of such dams and lakes were sited in rural areas at a time when land values were extremely low in comparison to present day values. These dams were also permitted prior to present day environmental rigor and enjoy grandfathered environmental permissions. The loss of value due to loss of original intended function may be very small in comparison to intrinsic value of grandfathered environmental permission and appreciated value of land as urbanization edges toward manmade lake sites.

A dam owner's liability understandably increases with the degradation of the dam. Many owners, however, are surprised to learn not only that their liability increases with downstream urbanization within the breach inundation limits of their dam, but that their design standard intensifies with such urbanization. It is not uncommon that the upgraded standard results in the requirement for a spillway with double or triple the capacity that was required prior to urbanization.

The 2014 Farm Bill included $262M nationwide to be used over the next 6 years under the Watershed Rehabilitation Program authorized by the Watershed Protection and Flood Prevention Act, Public Law 566 (amended in 2000) providing financial assistance at the rate of 65% of actual construction costs. Nationwide, over 11,000 dams would qualify for this assistance resulting in an average of less than $24,000 per structure. The Association of State Dam Safety Officials' *The Cost of Rehabilitating Our Nation's Dams*, 2009 estimated that $51.46B (2009 dollars) would be needed to rehabilitate the nation's dams—$16B for the most critical dams.

Many lakes are not used for water supply purposes and are in watersheds with available yield. Many existing dams do not have operable spillways and therefore release flows downstream as pool levels rise due to runoff. Continuing, if there happens to be a water supply lake downstream and if that lake is below conservation pool level, the upstream release will benefit the water supply lake. In many cases, however, the releases are not timely or are not in a location that currently needs the water.

Thus, the pending application is directed to a water supply control system that helps address the water crisis discussed above. In particular, the water supply control system disclosed herein leverages non-water supply lakes with existing dams to supply water to water supply lakes by timely controlling water flow throughput based on water levels of the water supply lakes and conditions of the existing dams while also accounting for external factors such as weather related events and other events. The water supply control system may comprise a computer-implemented controller implemented in a supervisory control and data acquisition (SCADA) system that controls a series of gates, valves, and/or other flow controllers as well as pumps to timely adjust water flow through one or more conveyance elements (e.g., pipes, conduits, culverts, channels, ditches, creeks, rivers, streams, aqueducts, etc.) from the non-water supply lakes to the water supply lakes when the water supply lakes fall below a water level threshold. The SCADA system may comprise numerous interdependent and/or autonomous elements such as programmable logic controllers, distributed control systems, or other elements. The water supply control system may also comprise a plurality of sensors, which feed data to the computer-implemented controller. The computer-implemented controller may adjust the water flow through the one or more conveyance elements by controlling the series of gates and pumps based on such data from the sensors.

Prior to adjusting the water flow, a reservoir simulation modeling component may interface with a contract management component and receive a request to transfer excess water from a non-water supply lake to a water supply lake based on a water contract. The contract management component may correlate the non-water supply lake and the water supply lake with their corresponding geographic locations so that the contract management component can more easily interface with the reservoir simulation modeling component. The reservoir simulation modeling component may determine, based at least in part on sensor data and the geographic locations of the non-water supply lake and the water supply lake, whether transferring water from the non-water supply lake to the water supply lake will cause or worsen a flood event. Additionally or alternatively, the reservoir simulation modeling component may determine, based at least in part on sensor data, whether retaining water could cause damage to the dam at the non-water supply lake. If the reservoir simulation modeling component determines that transferring of water from the non-water supply lake to the water supply lake will not cause or worsen a flood event and/or if the reservoir simulation modeling component determines that holding the water would cause damage to the dam at the non-water supply lake, the computer-implemented controller may issue a command to cause a gate associated with a dam at the non-water supply lake to open such that water is transferred from the non-water supply lake to the water supply lake via a pipe. Consideration of flood management in determining whether to issue the command to supply water from the non-water supply lake to the water supply lake is unique because typically flood forecasting and mitigation technologies and water supply technologies are siloed from each other.

Since the smaller dams at the non-water supply lakes are not manned like the larger dams at water supply lakes, the computer-implemented controller may evaluate and implement one or more safety controls before issuing the command. In addition, a software program may be run locally at the smaller dams with a decision matrix that allows for safe, secure, unmanned, remote, semi-autonomous or autonomous operation that takes into account sensor data and commands from an operations center.

In some embodiments there will be structural and operational distinctions in the dams, spillways, transport, monitoring, measurement, and control of traditionally non-water-supply lakes, unrehabilitated water supply lakes, rehabilitated water supply lakes, and modern water supply lakes. In embodiments, distinct challenges of the traditionally non-water supply lakes and their integration into the current water supply system are solved by the differences in monitoring (at and around traditionally non-water supply source and along the transit pathways to the current water supply source) and control systems along the same sources and pathways, which are addressed with both structural differences in the dams, spillways, and transit paths and in how they are operated and are controlled using computer-implemented control system. Similarly, as the use and structure of these non-water supply lakes and flow paths and water transit involving the water of such lakes is modified for this approach, new environmental challenges and risks may be a consequence of the changing uses. In embodiments, similar distinctions in structure and operations from the more traditional water supply lake system may be incorporated to mitigate and/or address those risks and challenges.

Turning now to FIG. 1, a water grid 100 is described. The water grid 100 may comprise a water supply lake 102 as well as a district treatment plant 104 where water is treated before being transferred for use. The water grid 100 may also comprise a plurality of non-water supply lakes 106a, 106b, and 106c. While only one water supply lake 102, one district treatment plant 104, and three non-water supply lakes 106a-c are illustrated in FIG. 1, a person of ordinary skill in the art would recognize that any number of such components could be present without departing from the spirit or scope of the present disclosure.

The non-water supply lakes 106a-106c may not have been previously connected to the water supply lake 102 or to each other. For example, the non-water supply lakes 106a-106c may have only had a gravity connection with one or more other lakes. In contrast to the typical limited connectivity of the non-water supply lakes 106a-106c, in the water grid 100, each of the non-water supply lakes 106a-106c may be connected to the water supply lake 102 via pipes 108a, 108b, and 108c.

In an embodiment, one or more of the non-water supply lakes 106a-106c may be connected to another of the non-water supply lakes 106a-106c. For example, as illustrated in FIG. 1, non-water supply lake 106a may be connected via pipe 108d to non-water supply lake 106b, which may be connected via pipe 108e to non-water supply lake 106c. Because the increased connectivity between the non-water supply lakes 106a-106c and the water supply lake 102, pipes 108a-108c as well as pipes 108d and 108e may be relatively small diameter pipes. For example, the pipes may be 18 inches to 48 inches in diameter or some other diameter.

The water grid 100 may comprise a plurality of pumps 110a, 110b, 110c, 110e, and 110d. Each of the pumps 110a-110e may be associated with a pipe 108a-108e and used to pump water to a different destination through the associated pipe 108a-108e. For example, pump 110a may be associated with pipe 108a and may pump water from non-water supply lake 106a to water supply lake 102, pump 110b may be associated with pipe 108b and may pump water from non-water supply lake 106b to water supply lake 102, and pump 110c may be associated with pipe 108c and may pump water from non-water supply lake 106c to water in supply lake 102. Similarly, pump 110d may be associated with pipe 108d and may pump water from non-water supply lake 106b to non-water supply lake 106a or vis-a-versa and pump 110e may be associated with pipe 108e and may pump water from non-water supply lake 106c to non-water supply lake 106b or vis-a-versa. In an embodiment, the pumps 110a-110e are operated as floods accumulate to distribute capacity where needed and stop pumping when the non-water supply lake 106a-106c reaches the conservation pool elevation (i.e., the maximum normal operating level). While only one pump 110a-110e is shown associated with each pipe 108a-108e, additional pumps may be present without departing from the spirt or scope of the present disclosure.

Each of the non-water supply lakes 106a-106c may comprise a dam 112a-112c. The dams 112a-112c may be rehabilitated or modified dams. As discussed above, many existing dams associated with non-water supply lakes are in need of repair and can be modified with a minimum amount of environmental permitting. For example, currently, most small or medium sized dams operate with free openings or an ungated spillway, detaining excess floodwaters while retaining only the conservation pool. In an embodiment, the rehabilitated dams 112a-112c/non-water supply lakes 106a-106c have gated spillways to hold floodwaters so that they can be piped to the water supply lake 102 or even directly to the district treatment plant 104. Thus, the water grid 100 would include an increasing number of rehabilitated small or medium sized dams (e.g., dams 112a-112c) and their non-water supply lakes (e.g., non-water supply lakes 106a-106c) that are permitted, rehabilitated, equipped, and connected to the system such as by the Water Grid Authority (WGA). The water supply lake 102 may also comprise a dam although it is not illustrated in FIG. 1.

Traditionally, most non-water supply lakes are minimally monitored for example for dam safety alone. In contrast, each of the non-water supply lakes 106a-106c comprise a plurality of sensors 116a, 116b, and 116c to collect data about the corresponding non-water supply lakes 106a-106c. The sensors 116a-116c may be located at the non-water supply lakes 106a-106c, on the dams 112a-112c, on the pipes 108a-108e, or remote from the non-water supply lakes 106a-106c, the dams 112a-112c, and/or the pipes 108a-018e, sensing environmental information for the region of the water grid 100. In some embodiments, the sensors 116a-116c may comprise one or more of a water elevation gauge on an upstream side of the dam 112a-112c, a flow detector and measuring device in the pipes 108a-108e, a static gauge to tell what the elevation of the water inside the dam 112a-112c is, a seismic gauge, or another sensor. The sensors 116a-116c may collect data including water elevation behind the dams 112a-112c, water elevation of a creek below the non-water supply lakes 106a-106c, flow rates, position of control gates 114a, 114b, 114c associated with the dams 112a-112c, camera feeds, or other data. The water supply lake 102 may also comprise sensors 116d to collect data about the water supply lake 102. In some embodiments, the sensors 116a-116c associated with the non-water supply lakes 106a-106c collect more data than the sensors 116d since the non-water supply lakes 106a-106c may not be manned constantly like the water supply lake 102 may be. Alternatively, the sensors 116a-116d may collect the same or similar data.

The data from the sensors 116a-116c may be transmitted to a remote monitoring and control server computer for analysis. The dams 112a-112c may hold flood water until instructed by a supervisory control and data acquisition (SCADA) system 118 to move excess flood water to an in need water supply lake (e.g., water supply lake 102) for water supply. In an embodiment, the remote monitoring and control server computer analyzing the data from the sensors 116a-116c is a part of the SCADA system 118. Having the SCADA system 118 comprise a central monitoring and control location may eliminate the need for onsite staff at each non-water supply lake 106a-106c, while also allowing for better oversight and management of the system as a whole. Local sponsors would continue to make observations periodically and after significant runoff events and could be tasked with managing minor repairs, but, more importantly, would be tasked with initiating emergency actions if needed. Real-time data collection and forecast modeling could provide analysis to maintain optimal system operation. Such data would include radar reflectivity measurements of precipitation, creek and river stage levels at key locations, lake levels, flow rates, and demands (current and forecast).

The SCADA system 118 for controlling the water grid 100 according to the disclosure may include the sensors 116a-116d discussed above, which measure and communicate data to monitoring and control facilities. The SCADA system 118 may also include communication capabilities to obtain additional data from other systems, such as meteorological systems, satellite imaging systems, the SCADA systems of other water grids, etc.

The water grid 100 will place a demand on small dams 112a-112c/non-water supply lakes 106a-106c that will provide an avenue for upgrading their condition as well as ensuring their long-term maintenance. Upgrades may include stabilizing embankments, desilting the lake bottom, increasing dam height, increasing spillway capacity, and installing an operable control gate 114a-114c. Additional improvements may include pumps 110a-110e, sensors 116a-116d, gate operators, metering, and monitoring. A SCADA remote terminal unit (RTU) may adapt the facility to the water grid 100.

In that most of these dams 112a-112c associated with non-water supply lakes 106a-106c are privately held, the owner would need to grant permission to allow retrofitting his/her dam 112a-112c with the necessary equipment (e.g., pipes 108a-108e, pumps 110a-110e, control gates 114a-114c, sensors 116a-116c, etc.). The incentives to the owner would be retaining the conservation pool use of the non-water supply lake 106a-106c, retaining ownership of the dam 112a-112c and non-water supply lake 106a-106c, receiving necessary repairs and upgrades to the dam 112a-112c (risk reduction), non-water supply lake 106a-106c and spillway, and receiving repairs as needed and annual maintenance. The benefits to the participating state would be increased capture of excess floodwaters without purchasing land for a reservoir, quicker implementation, as many dams and lakes are already environmentally permitted or grandfathered, and much sooner implementation of additions to the water budget.

Legally, the grid operator (the Water Grid Authority or WGA) may be a water utility with the right to charge utility districts and municipalities for the sale and transfer of water to their facilities. The WGA may also have the power to purchase water from captive sources during floods and to issue utility revenue bonds for construction. Funding for rehabilitation of the dam 112a-112c, spillway, and/or non-water supply lake 106a-106c may come primarily from these utility revenue bonds but could also include contributions from the local sponsor, local water authority, end user, or developer, depending on the enduring use.

The grid 100 may be implemented with a relatively small investment within years rather than decades and grow as the process is proved and refined. Persons fulfilling the following roles may contribute to establishing feasibility in a particular region for constructing the water grid 100 according to the disclosure:

1) Reservoir modeling specialist—USACE typically maintains a computer model of the reservoirs in their system that they use for forecasting and other purposes. This model may need to be used as a baseline for the existing system and modified in order to assess impacts/effectiveness of proposed concept.
2) Meteorologist—Will correlate historical rainfall data to smaller basins for estimating yield.
3) Land Appraiser—To establish the value of land that would be required for accomplishing a project in order to understand the full project cost.
4) List of Texas dam owners and GIS database—In order to identify potential candidate sites.
5) Rule Curves for Texas Lakes—Gated lakes are operated according to a set of rules intended to optimize one or more of various conditions, such as fisheries, raw water quality for treatment as drinking water, flood capacity, recreation, seasonal variations, etc. Such curves are typically developed for lakes based on years of recorded data to better govern the operation of the lake.
6) Owner Interviews—Interview a representative sample of owners to establish stakeholder interest and needs.
7) Dam Safety Evaluation—Obtain TCEQ's most recent evaluation (if existing and available) for candidate sites. Conduct site investigation to assess embankment condition, hazard category and repair/maintenance needs.
8) Environmental and Regulatory Permitting
9) Contracting
10) Civil and Hydraulic Engineering
11) Construction Cost Estimating While some of the present disclosure is presented with particular reference to implementation in Texas, it will be understood that the concepts of the present disclosure may be applied in other geographical locations.

A representative installation would begin with a lake (e.g., one of the non-water supply lakes 106a-106c) that has a conservation pool with a surface area of 100 acres (originally 125 acres but now reduced due to siltation), a flood pool with a surface area of 300 acres, and an average conservation pool depth of 2 feet. Recent construction of a major transportation route immediately downstream may have rendered the dam 112a-112c deficient and the dam 112a-112c may be in poor condition per a recent TCEQ inspection. The lake may be situated in a sub-watershed such that all of its excess flood flows are currently passed to the Gulf of Mexico. The cost to upgrade the structure is likely beyond the ability of the owner and local sponsors, yet the lake may adequately serve to reduce flooding of agriculture and provides some irrigation.

Participation in the dam rehabilitation program may be voluntary. A non-water supply lake 106a-106c/dam 112a-112c owner may apply for participation and undergo a screening process to determine if his/her installation would qualify. The owner may agree to participate in the cost of the rehabilitation but not in the cost of the adaptation to the water grid 100. The owner's participation may be substantial (for instance, as much as 35% of the total costs) and in the form of a lien on the property that would go away after a number of years (e.g., 25 years or so). This may reduce the potential for abuse by those intending only to improve property value for a sale at the state's expense.

Once rehabilitated, outfitted, and connected to the system, the non-water supply lake 106a-106c may resume operations in a capacity very similar to pre-modification conditions from the standpoint of the local sponsors and owner. However, through the SCADA network, local precipitation, upstream and downstream creek levels, lake level, inflow and outflow rates, all would now be collected and contained in a real-time database used for input for the reservoir modeling. When a rainfall event results in the capture of excess runoff in the lake, the Command and Control office associated with the SCADA system 118 may make a decision and issue a command (offline or preprogrammed) to pump the stored excess to the district treatment plan 104 for distribution or to another lake (e.g., water supply lake 102 or another non-water supply lake 106a-106c) currently below conservation pool. Such an action would restore the lake to conservation pool and full design flood capacity. Flow metering and lake level monitoring for example via sensors 116a-116d may provide the basis for an accurate accounting of captured, pumped, and locally consumed water.

Decision points controlling the pumping of water to or from a non-water supply lake 106a-106c may include the level of the non-water supply lake 106a-106c after the runoff event. For example, if the lake level was below conservation pool prior to the event and is still below or only at conservation pool elevation after the event, then no transfer would occur. However, if the post-event level is above conservation pool elevation, then a transfer would occur until conservation pool elevation is reached. As discussed above, monitoring of conditions at the non-water supply lakes 106a-106c and the system at-large and control of the flow from the non-water supply lakes 106a-106c may be maintained through the SCADA system 118.

Decision points controlling the pumping of water to or from a non-water supply lake 106a-106c may include the temporary storage of transfer water from another source such as if the non-water supply lake 106a-106c is used for storage due to temporary surcharge of the system, which might happen if other large transfers happen to be overwhelming the piping network. Volume calculations based on real-time measurement of inflow and outflow through the SCADA system 118, along with other normally monitored information, may provide the necessary factors for controlling flow also via the SCADA system 118. Utility districts, municipalities, and/or other customers of the WGA may be billed for delivered volumes as determined through the SCADA system 118 monitored site, corroborated by flow metering at the customer's site.

Figure 2:
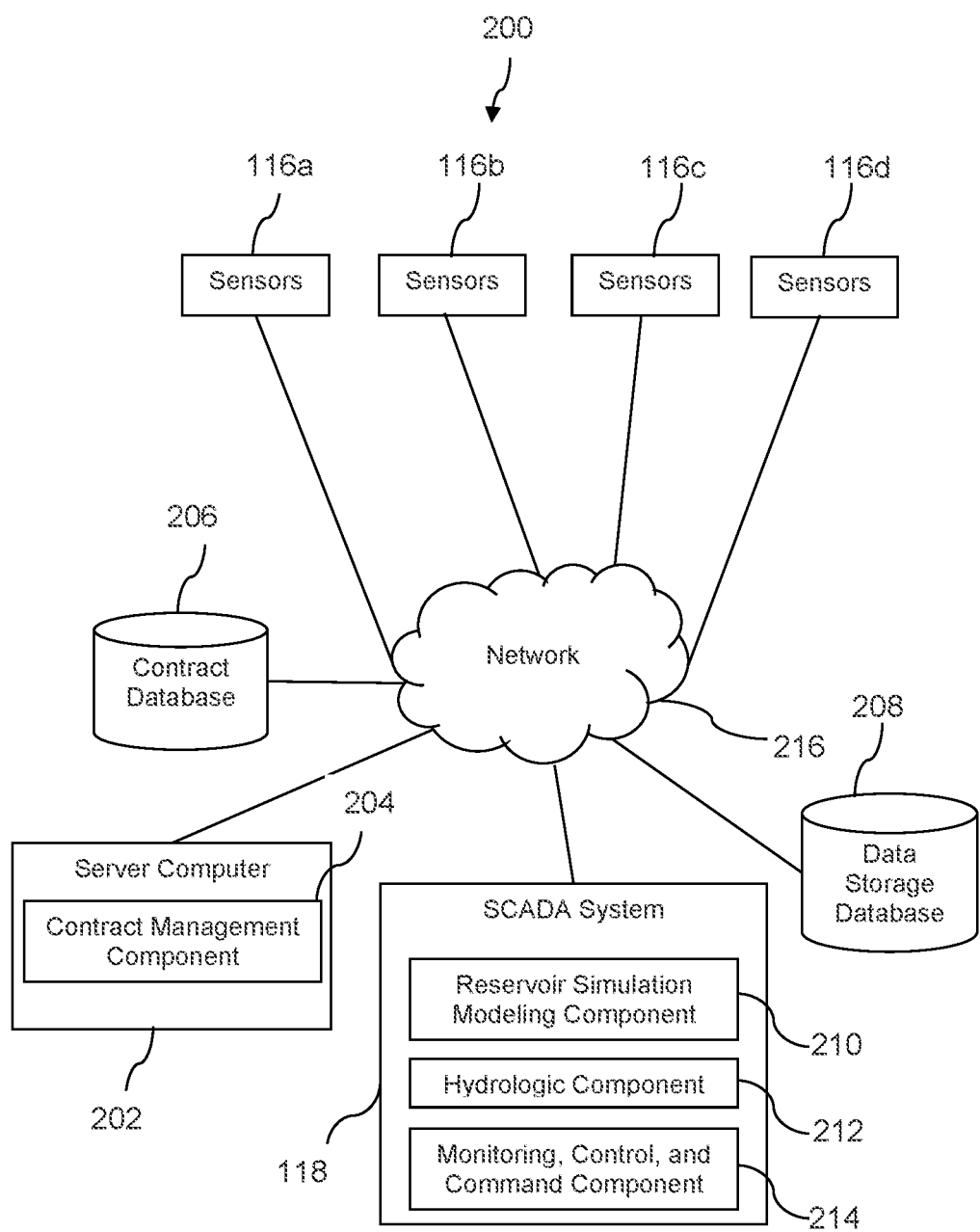
FIG. 2 is a block diagram of a water supply control system according to an embodiment of the disclosure.

Turning now to FIG. 2, a water supply control system 200 is described. In embodiments all or parts of the water supply control system 200 will be a computer-implemented system. For example, at least some of the water supply control system may be implemented on a computer system. Computer systems are discussed in more detail hereinafter with reference to FIG. 4.

The water supply control system 200 may comprise sensors 116a-116d associated with the non-water supply lakes 106a-106c and water supply lake 102, a server computer 202, a contract management component 204, a contract database 206, a data storage database 208, the SCADA system 118, a reservoir simulation modeling component 210, a hydrologic component 212, a monitoring, control, and command component 214, and a network 216. While the contract management component 204 is shown as stored and executed by server computer 202, in some embodiments, the contract management component 204 may be stored and executed by the SCADA system 118. Similarly, while the reservoir simulation modeling component 210 and the hydrologic component 212 are illustrated as stored and executed by the SCADA system, such components may be stored and executed elsewhere, for example be server computer 202.

The contract management component 204 may analyze water contracts stored in the contract database 206 to determine when/where excess flood from the non-water supply lakes 106a-106c should go. Such analysis may include analyzing the conditions around each contract. For example, a contract may state that every time x has excess water, transfer water to y. In another example, a contract may state that every time x has excess water, y will have an option to purchase such excess water. In yet another example, a contract may state that x will purchase water from y only if their primary water supply lake is below a threshold.

In an embodiment, each of the water contracts are correlated with their geographical location(s). The contract management component 204 may interface with the reservoir simulation modeling component 210. The correlated geographic locations associated with each contract may help the contract management component 204 interface with the reservoir simulation modeling component 210 as will be discussed in more detail below.

The data storage database 208 may store the real-time data from the sensors 116a-116d. Reservoir simulation modeling components do not typically model smaller dams (e.g., dams 112a-112c) because such dams do not typically comprise the sensors 116a-116c needed to produce the real-time data necessary for reservoir simulation modeling. In contrast, the reservoir simulation modeling component 210 may take into account the real-time date from the sensors 116a-116d associated with the non-water supply lakes 106a-106c/dams 112a-112c and stored in the data storage database 208. In addition to taking into account the real-time reservoir data and watershed data, the reservoir simulation modeling component 210 may take into account existing volume/storage of dams 112a-112c, rainfall (predicted and actual), and/or hydrologic data from the hydrologic component 212 to determine when/where a flood will occur as well as what elevation will a lake or stream peak at. The reservoir simulation modeling component 210 may be used by flood fighters to control certain outlets on certain reservoirs to control flooding.

Flood forecasting and mitigation and water supply tend to be siloed technologies. For example, water supply systems typically leave flooding out of the equation when moving water for water supply. In contrast, the contract management component 204 interfaces with the reservoir simulation modeling component 210 to confirm that a transfer of water from a non-water supply lake (e.g., non-water supply lakes 106a-106c) in one or more geographic location(s) to another location (e.g., water supply lake 102 or district treatment plant 104) per a water contract stored in the contract database 206 does not exacerbate flood conditions. For example, if excess water from non-water supply lake 106a is to be moved to water supply lake 102 per a water contract in the contract database 206 as determined by the contract management component 204, but the reservoir simulation modeling component 210 indicates that movement of water in the geographic location(s) of the non-water supply lake 106a and/or water supply lake 102 would exacerbate flood conditions, the SCADA system 118, and in particular the monitoring, control, and command component 214, would not issue an instruction to control gate 114a to open to allow transfer water via pipe 108a to the water supply lake 102. If, however, the reservoir simulation modeling component 210 does not indicate that movement of water in the geographic location(s) of the non-water supply lake 106a and/or water supply lake 102 would exacerbate flood conditions, the SCADA system 118, and in particular the monitoring, control, and command component 214, may issue an instruction to control gate 114a to open to allow transfer water via pipe 108a to the water supply lake 102.

Larger dams are typically manned twenty-four hours a day. However, this is not likely feasible at the non-water supply lakes 106a-106c. Thus, one or more safety checks/controls may be implemented by the monitoring, control, and command component 214 before issuing an instruction to open a control gate 114a, 114b, or 114c of a dam 112a, 112b, or 112c. For example, the one or more safety checks/controls may prevent a control gate 114a, 114b, or 114c from opening if certain conditions are met. One safety check/control implemented by the monitoring, control, and command component 214 may prevent issuance of instructions to control gates 114a-114c when flood stage conditions exist. Another safety check/control implemented by the monitoring, control, and command component 214 may prevent issuance of instructions to a control gate 114a, 114b, or 114c until an operator is present at the corresponding dam 112a, 112b, or 112c. Other safety checks/controls may exist as well without departing from the spirit or scope of the present disclosure.

Network 216 promotes communication between the components of the water supply control system 200. The network 216 may be any communication network including a public data network (PDN), a public switched telephone network (PSTN), a private network, and/or a combination.

Figure 3:
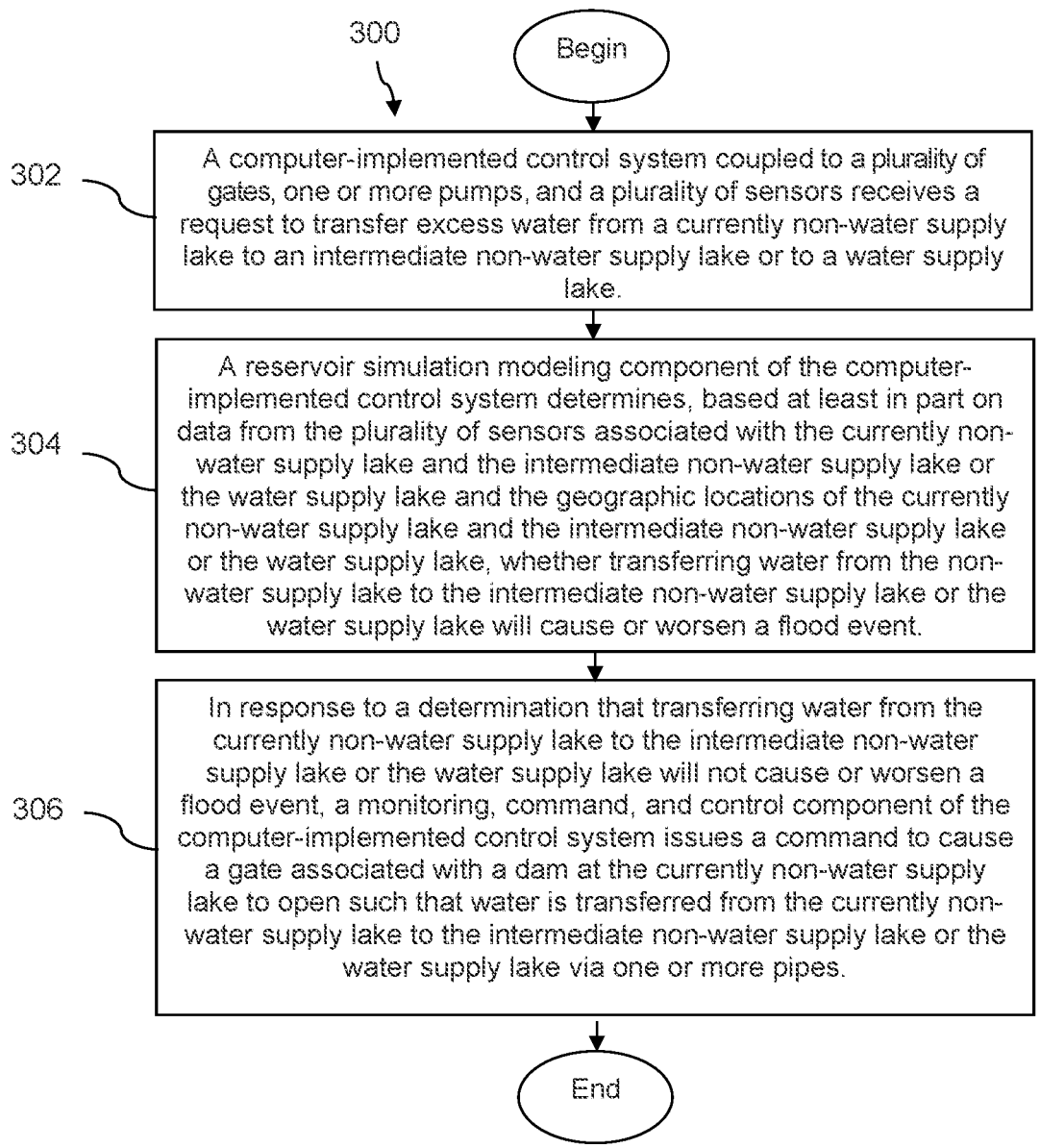
FIG. 3 is a flow chart of a method according to an embodiment of the disclosure.

Turning now to FIG. 3, a method 300 is described. At block 302, a computer-implemented control system (e.g., SCADA system 118) coupled to a plurality of gates (e.g., control gates 114a-114c), one or more pumps (e.g., pumps 110a-110e), and a plurality of sensors (e.g., sensors 116a-116d) receives a request to transfer excess water from a currently non-water supply lake (e.g., non-water supply lake 106a, 106b, or 106c) to an intermediate non-water supply lake (e.g., non-water supply lake 106a, 106b, or 106c) or a water supply lake (e.g., water supply late 102). At block 304, a reservoir simulation modeling component (e.g., reservoir simulation modeling component 210) of the computer-implemented control system determines, based at least in part on data from the plurality of sensors associated with the currently non-water supply lake and the intermediate non-water supply lake or the water supply lake and the geographic locations of the non-water supply lake and the intermediate non-water supply lake or the water supply lake, whether transferring water from the currently non-water supply lake to the intermediate non-water supply lake or the water supply lake will cause or worsen a flood event. At block 306, in response to a determination that transferring water from the non-water supply lake to the intermediate non-water supply lake or the water supply lake will not cause or worsen a flood event, a monitoring, command, and control component (e.g., monitoring, command, and control component 214) of the computer-implemented control system issues a command to cause a gate (e.g., control gate 114a, 114b, or 114c) associated with a dam (e.g., dam 112a, 112b, or 112c) at the currently non-water supply lake to open such that water is transferred from the currently non-water supply lake to the intermediate non-water supply lake to the water supply lake via one or more pipe (e.g., pipe 108a, 108b, or 108c).

Figure 4:
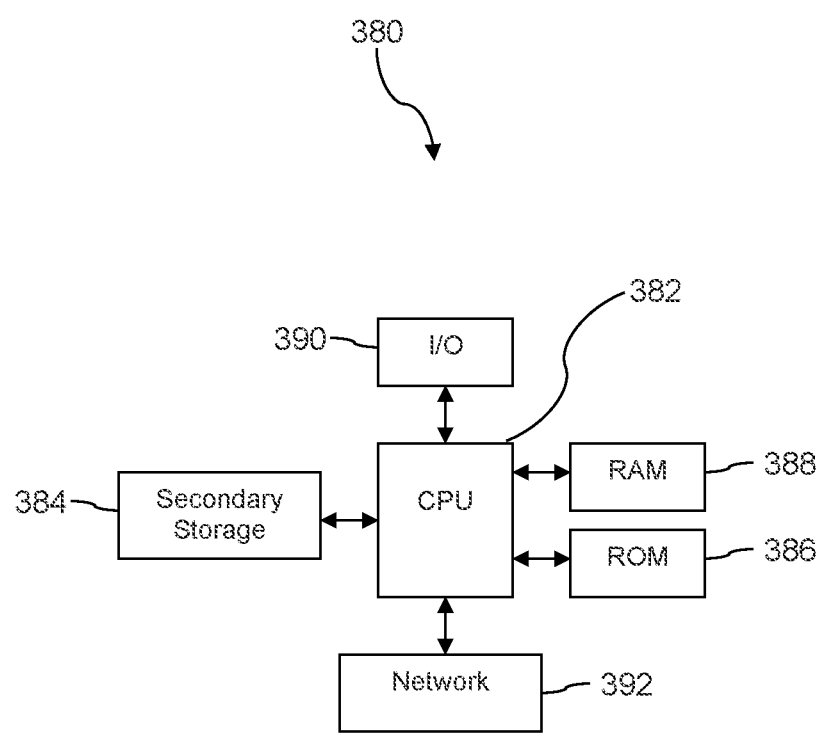
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A water supply control system for interconnecting a plurality of bodies of water, the system comprising:
   a plurality of conveyance elements adapted to transfer water between the plurality of bodies of water, wherein the plurality of bodies of water comprise a first body of water and a second body of water;
   a plurality of flow controllers associated with a plurality of dams at the plurality of bodies of water, the plurality of flow controllers adapted to adjust an amount of water flow through the plurality of conveyance elements;
   one or more pumps adapted to pump water through a corresponding one or more of the plurality of conveyance elements;
   a plurality of sensors associated with the plurality of bodies of water; and
   a computer-implemented control system coupled to the plurality of flow controllers, the one or more pumps, and the plurality of sensors, the computer-implemented control system configured to:
      receive a request to transfer water from the first body of water to the second body of water, wherein the first body of water and the second body of water are associated with one or more geographic locations,
      determine, via a reservoir simulation modeling component based at least in part on data from the plurality of sensors and the geographic locations of the first body of water and the second body of water, whether transferring water from the first body of water to the second body of water will cause or worsen a flood event, and
      in response to a determination that transferring water from the first body of water to the second body of water will not cause or worsen a flood event, issue a command, via a monitoring, control, and command component, to cause a flow controller associated with a dam at the first body of water to open such that water is transferred from the first body of water to the second body of water via one or more conveyance elements of the plurality of conveyance elements.

2. The system of claim 1, wherein the command further causes a pump to pump the water from the first body of water to the second body of water via the one or more conveyance elements.

3. The system of claim 2, wherein a second command is issued via the monitoring, control, and command component based on sensor data to cause the flow controller to close and the pump to stop pumping in response to the first body of water reaching its conservation pool elevation.

4. The system of claim 1, wherein the data from the plurality of sensors comprises one or more of water elevation behind one or more of the plurality of dams, water elevation of a creek below the first body of water, flow rates, position of one or more of the plurality of flow controllers, or a camera feed from a camera located at the dam at the first body of water.

5. The system of claim 1, wherein the one or more geographic locations are received in the request.

6. The system of claim 5, wherein the request to transfer water from the first body of water to the second body of water is from a contract management component based on a water contract stored in a contract database.

7. The system of claim 1, wherein the second body of water is below its conservation pool elevation prior to transfer of water from the first body of water to the second body of water.

8. The system of claim 1, wherein the reservoir simulation modeling component determines whether transferring water from the first body of water to the second body of water will cause or worsen a flood event based further on one or more of existing volume of one or more dams of the plurality of dams, actual rainfall, predicted rainfall, or hydrologic data from a hydrologic component.

9. The system of claim 1, wherein the plurality of sensors comprise a water elevation gauge, a flow detector and measuring device in a conveyance element, a static gauge, or a seismic gauge.

10. The system of claim 1, wherein the plurality of flow controllers comprise at least one gate, and wherein the plurality of conveyance elements comprise at least one pipe.

11. A water supply control method for interconnecting a plurality of bodies of water, the method comprising:
   receiving, by a computer-implemented control system coupled to a plurality of flow controllers, one or more pumps, and a plurality of sensors, a request to transfer water from a first body of water to a second body of water, wherein the first body of water and the second body of water are associated with one or more geographic locations;
   determining, via a reservoir simulation modeling component of the computer-implemented control system, based at least in part on data from the plurality of sensors and the geographic locations, whether transferring water from the first body of water to the second body of water will cause or worsen a flood event; and
   in response to a determination that transferring water from the first body of water to the second body of water will not cause or worsen a flood event, issuing a command, via a monitoring, control, and command component of the computer-implemented control system, to cause a flow controller associated with a dam at the first body of water to open such that water is transferred from the first body of water to the second body of water via one or more conveyance elements.

12. The method of claim 11, wherein the command further causes a pump to pump the water from the first body of water to the second body of water via the one or more conveyance elements.

13. The method of claim 12, further comprising issuing a second command, via the monitoring, control, and command component based on sensor data, to cause the flow controller to close and the pump to stop pumping in response to the first body of water reaching its conservation pool elevation.

14. The method of claim 11, wherein the data from the plurality of sensors comprises one or more of water elevation behind one or more of a plurality of dams at the plurality of bodies of water, water elevation of a creek below the first body of water, flow rates, position of one or more of the plurality of flow controllers, or a camera feed from a camera located at the dam at the first body of water.

15. The method of claim 11, wherein the one or more geographic locations are received in the request.

16. The method of claim 15 wherein the request to transfer water from the first body of water to the second body of water is from a contract management component based on a water contract stored in a contract database.

17. The method of claim 11, wherein the second body of water is below its conservation pool elevation prior to transfer of water from the first body of water to the second body of water.

18. The method of claim 11, wherein determining, by the reservoir simulation modeling component, whether transferring water from the first body of water to the second body of water will cause or worsen a flood event is based further on one or more of existing volume of one or more dams of a plurality of dams at the plurality of bodies of water, actual rainfall, predicted rainfall, or hydrologic data from a hydrologic component.

19. The method of claim 11, wherein the plurality of sensors comprise a water elevation gauge, a flow detector and measuring device in a conveyance element, a static gauge, or a seismic gauge.

20. The method of claim 11, wherein the plurality of flow controllers comprise at least one gate, and wherein the plurality of conveyance elements comprise at least one pipe.

* * * * *